United States Patent
Idnani et al.

(10) Patent No.: US 7,089,006 B2
(45) Date of Patent: Aug. 8, 2006

(54) SYSTEM AND METHOD OF SWITCHING BETWEEN CALLS WHEN HANDING OFF A MOBILE STATION OUT OF A WLAN

(75) Inventors: Ajaykumar R. Idnani, Schaumburg, IL (US); Alex P. Hirsbrunner, Bloomingdale, IL (US); Timothy Wilson, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 112 days.

(21) Appl. No.: 11/006,965

(22) Filed: Dec. 8, 2004

(65) Prior Publication Data
US 2006/0121900 A1 Jun. 8, 2006

(51) Int. Cl.
*H04Q 7/20* (2006.01)
(52) U.S. Cl. ............ 455/436; 455/426.2; 455/445
(58) Field of Classification Search .......... 455/436, 455/426.1, 426.2, 445
See application file for complete search history.

(56) References Cited

U.S. PATENT DOCUMENTS

| | | | |
|---|---|---|---|
| 2004/0072593 A1* | 4/2004 | Robbins et al. | 455/560 |
| 2004/0266426 A1* | 12/2004 | Marsh et al. | 455/426.2 |
| 2005/0119005 A1* | 6/2005 | Segal et al. | 455/445 |
| 2005/0239468 A1* | 10/2005 | Segal | 455/444 |

* cited by examiner

Primary Examiner—Erika A. Gary

(57) ABSTRACT

A system and method switches between an active call and a call on hold when handing off a mobile station (204) from a Wireless Local Area Network (WLAN) (202). A Handover Starting message is received from a mobile station. The Handover Starting message includes at least one first identifier. A Notification message is also received. The Notification message includes a second identifier. The at least one first identifier is compared to the second identifier and a handover of the mobile station (204) proceeds when a match is determined. Subsequently, the mobile station (204) switches from an active call to a call on hold.

15 Claims, 3 Drawing Sheets

SYSTEM AND METHOD OF SWITCHING BETWEEN CALLS WHEN HANDING OFF A MOBILE STATION OUT OF A WLAN

FIELD OF THE INVENTION

The field of the invention relates to routing of communications through networks and, more specifically, handing off mobile stations from one network to another network.

BACKGROUND OF THE INVENTION

Mobile stations that operate in Wireless Local Area Networks (WLANs) are often capable of engaging in multiple calls. For example, a first user at the mobile station may be engaged in an on-going voice call with a second user, another voice call from a third user may arrive at the mobile station of the first user, and the first voice call may be put on hold. After completing the call from the third user, the first user may switch back to the initial call (that had been placed on hold) and continue the first call with the second user.

Some WLANs are connected to other networks, such as a cellular networks or the Public Switched Telephone Network (PSTN). Mobile stations operate within WLANs and utilize various protocols and messages to communicate. In one example, some wireless systems use the Session Initiation Protocol (SIP) to enable communications between mobile stations. Specifically, certain messages such as SIP INVITE messages are exchanged between mobile stations to initiate and conduct communications between these devices.

Mobile stations are typically not stationary within WLANs or other networks. For example, if the mobile station is a dual mode cellular telephone, the phone typically moves within the WLAN and then between the WLAN and other networks. When the mobile station leaves the WLAN, it is handed off (or over) to the receiving network. Various messaging protocols and sequences have been developed to ensure that the transition occurs smoothly.

Previous systems, however, do not allow a user at a mobile station to switch between an active call and a call on hold while the user is handed out of the WLAN system. This inability to switch between calls when handing a mobile station out of the WLAN system results in unpredictability in service for users, potential lost calls, and user dissatisfaction with system performance.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method allows for switching between an active call and a call on hold when a mobile station is being handed out of a Wireless Local Area Network (WLAN). The approaches described herein result in an enhanced user experience as calls can be switched as the mobile station is handed out of the network.

In many of these embodiments, a Wireless Services Manager (WSM) switches between an active call and a call on hold when handing off a mobile station from a WLAN to a wide area network (WAN). A Handover Starting message is received from a mobile station at the WSM. The Handover Starting message includes at least one first identifier. Subsequent to receiving the message, the mobile station switches from an active call to a call on hold.

A Notification message is also received at the WSM from a Private Branch Exchange (PBX). The Notification message includes a second identifier. The second identifier may identify a call at the mobile station or identify the mobile station itself. Then, at least one first identifier is compared to the second identifier and a handover of the mobile station proceeds when a match is determined. For example, if a list of active calls on the mobile station is provided and the Notification message includes a call identifier, the call identifier is compared to the list of calls to determine if a match exists.

Alternatively, in the case where the identifiers are not call identifiers but identifiers that identify the mobile station, the identifier in the Handover Starting message may be compared to the identifier in the Notification message. If a match is determined, then the hand out of the call occurs.

Thus, a system and method is described that allows a transition to be made from an active call to a call on hold when a mobile station is handed out of a network. The approach is easy to implement and results in an enhanced user experience and less dropped calls as the mobile moves across different networks.

Figure 1:
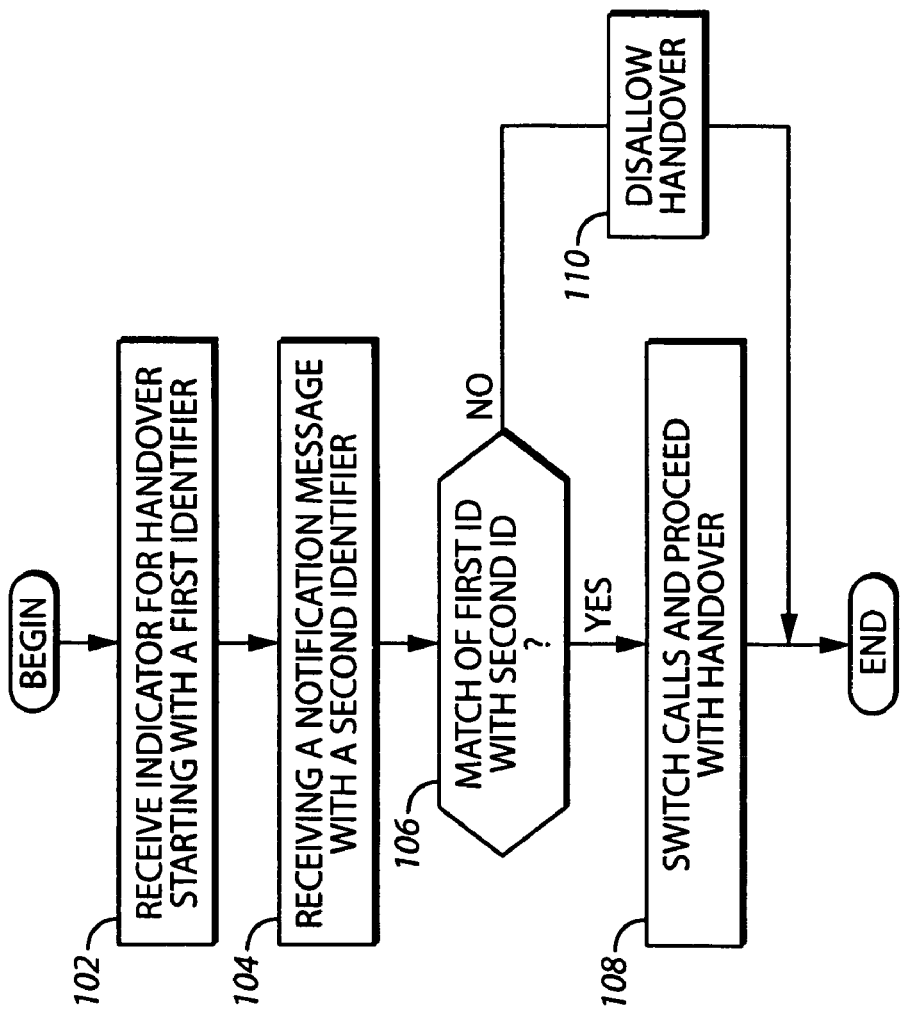
FIG. 1 is a flowchart of an approach for handing a mobile station out of a network according to an embodiment of the present invention.

Referring now to FIG. 1, an approach for switching from an active call to a call on hold while handing a mobile station from a first network to a second network is described. At step 102, a Handover Starting message is received from a mobile station. The message includes an indication that a handover is starting and also includes a first identifier. The first identifier may be a list that identifies all ongoing calls occurring at the mobile station. Alternatively, no call identifiers may be provided and the first identifier may identify a mobile station. In another example, both a list of active calls and the identity of the mobile station may be provided.

The Handover Starting message may be received at a Wireless Services Manager (WSM). Alternatively, the message may be received at other points in the network and the subsequent processing described herein may occur at any one of these points or be distributed across several different points.

At step 104, a Notification message is received from a Private Branch Exchange (PBX) at the same location as where the Handover Starting message was received. The Notification message may include a second identifier. The second identifier may indicate an identity of a call or, alternatively, an identity of a mobile station.

At step 106, a determination is made as to whether the first identifier matches the second identifier. In the case where call identifiers are received at the WSM, the call identifier received in the Notification message is compared to a list of call identifiers received in the Handover starting message. In the case where mobile station identifiers are received at the WSM, the mobile station identifier received in the Notification message is compared to the mobile station identifier received in the Handover starting message. If the answer at step 106 is affirmative, execution continues at step 108. If the answer is negative, then at step 110 the handover is disallowed and execution ends.

At step 108, the WSM proceeds with the handout thereby allowing the mobile station to switch between calls during the course of the handout. In one embodiment, only one call will be transferred in the handout and the current active call is used rather than the call on hold.

Figure 2:
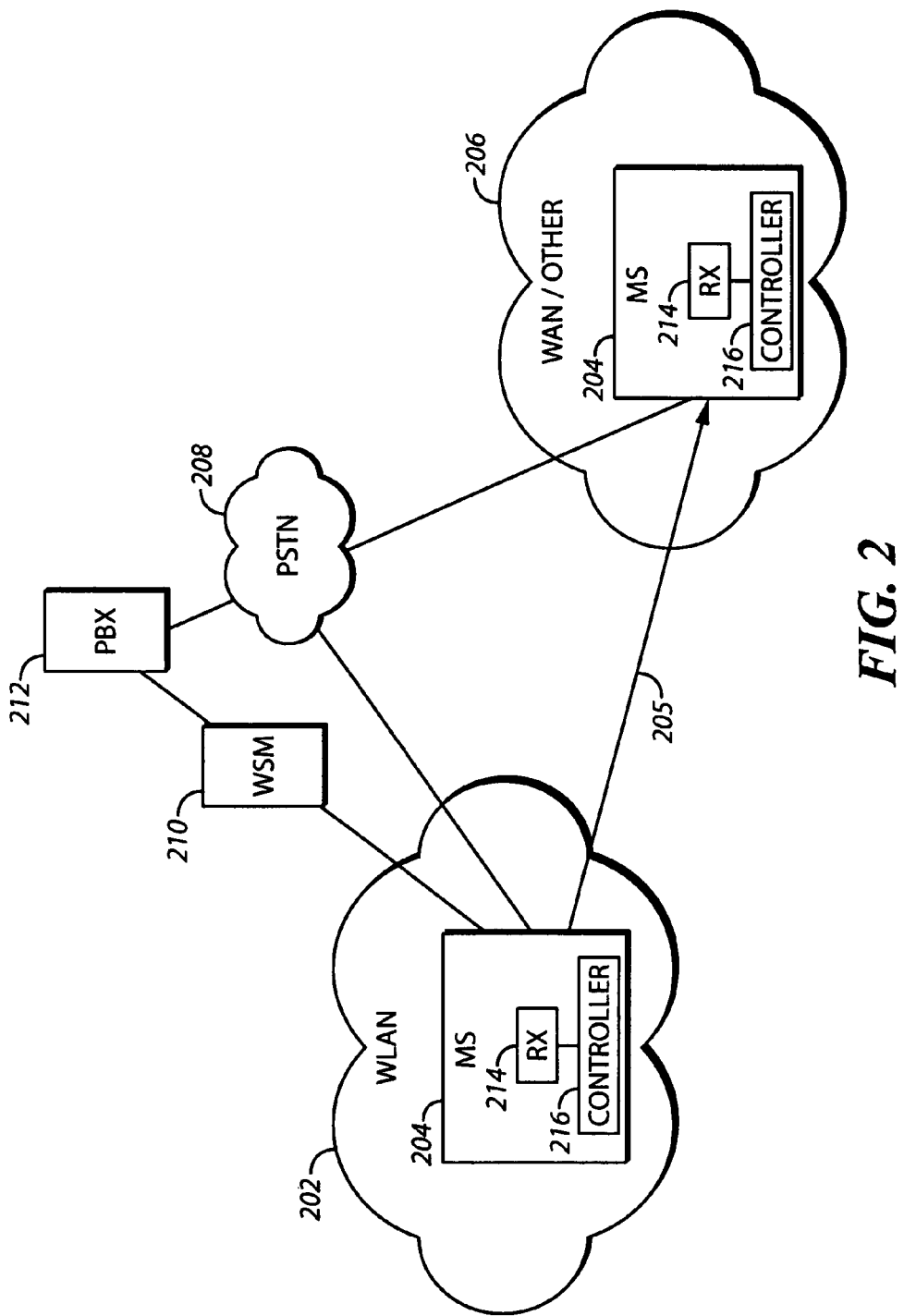
FIG. 2 is a block diagram of a system for handing a mobile station out of a network according to an embodiment of the present invention.

Referring now to FIG. 2, a system for switching an active call and an on-hold call while handing a mobile station from one network to another network is described. The system comprises a mobile station 204 that operates in a WLAN 202. The mobile station 204 moves along path 205 to a second network 206, which may be a wide area network (WAN) or other type of network. A Wireless Services Manager (WSM) 210 is communicatively coupled to the mobile station 204 as is a Public Switched Telephone Network 208. The WSM 210 and the PSTN 208 are also coupled to a Private Branch Exchange (PBX) 212.

The WSM 210 provides wireless services to users. For example, the WSM 210 may provide for switching between active calls and on-hold calls. The WSM 210 additionally is in the path of origination from a mobile station to the PBX 212. The WSM 210 provides SIP registrar functions and helps in locating a mobile station to terminate SIP requests to the mobile stations. The WSM 210 also provides bootstrap and security functions.

The PSTN 208 is a landline communication system that provides telephone services between different users as is known in the art. The PBX 212 provides connection services to local and remote networks. The mobile station 204 may be any type of mobile wireless device such as a cellular phone, pager, or personal digital assistant (PDA). Other examples of mobile stations are possible. In still another approach, both types of information may be provided when a dual (or more) mode wireless device is used.

In one example of the operation of the system of FIG. 2, a Handover Starting Message is received at the WSM 210 from the mobile station 204 while the mobile station is in the WLAN 202. The message includes an indication that a handover is starting and also includes a first identifier. The first identifier may identify all ongoing calls occurring at the mobile station. Alternatively, the first identifier may identify a mobile station and include no call identifiers.

A Notification message is received at the PBX 212. The Notification message may include a second identifier. The second identifier may indicate an identity of a call or, alternatively, an identity of a mobile station 204. A determination at the WSM 210 is made as to whether the first identifier matches the second identifier. For example, when call identifiers are received in the Notification and Handover starting messages, a call identifier received in the Notification message is compared to the list of call identifiers received in the Handover starting message. In the case where mobile station identifiers are received in the Handover Starting and Notification messages, the mobile station identifier received in the Notification message is compared to the mobile station identifier received in the Handover Starting message.

If a match is identified in the comparison of the identifiers, the WSM 210 proceeds with the handout of the mobile station 204 from the WLAN 202 to the network 212. Again, the identifiers may relate to on-going calls or mobile stations or both. During the course of the handout, the mobile station 204 may switch between an active call and a call on hold. Thus, a handout of one call (e.g., the active call) is made successfully even if the user switches between calls.

The mobile station 204 includes a receiver 214 for receiving the Handover Starting message. The mobile station also includes a controller 216, which is coupled to the receiver 214. The controller 216 is programmed to compare the first identifier to the second identifier and to proceed with a handover of the mobile station 204 when a match is determined and allow switching from a current call to a call on hold at the mobile station 204.

Figure 3:
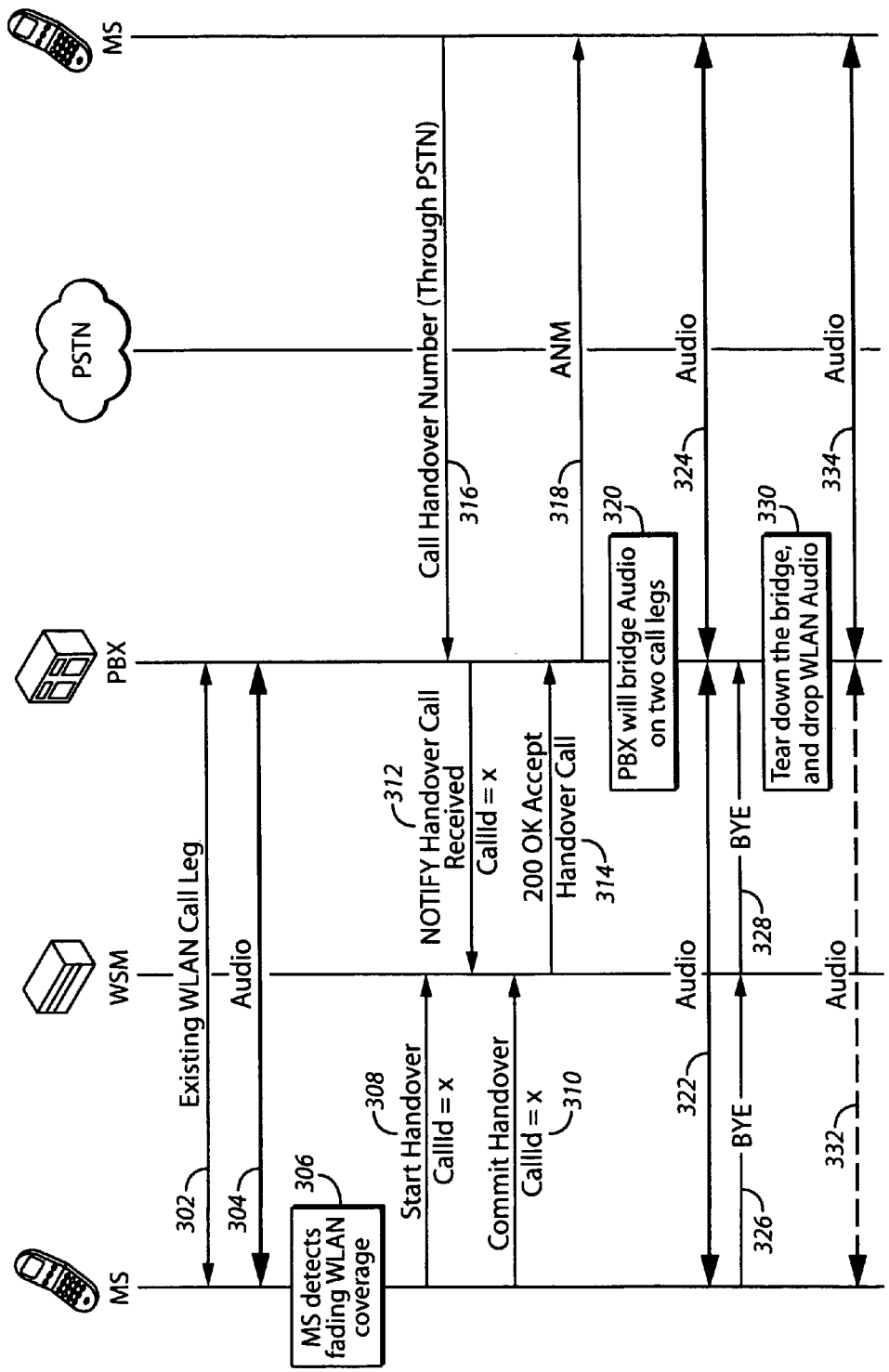
FIG. 3 is a call flow diagram of an approach for handing a mobile station out of a network according to an embodiment of the present invention.

Referring now to FIG. 3, an approach for handing a mobile station from one network to another network is described. At step 302, an existing call leg is shown to be established between a mobile station and the Private Branch Exchange (PBX). The call leg includes an audio portion 304. The audio portion 304 represents the audio information that is exchanged between the PBX and the mobile station.

At step 306, the mobile station detects that the coverage of the WLAN is fading in the WLAN. This is done by RF measurement algorithms residing inside the mobile station, which can sense the strength of a signal and predict how soon the mobile station will lose WLAN coverage. At step 308, the mobile station sends a Handover Starting message to the WSM. The message includes a list of call identifiers, in this case, including the call identifier X. At step 316, the mobile station calls the handover number through the PSTN, which lands on the PBX. At step 312, the PBX informs the WSM that the handover call has been received. The message includes an identifier corresponding to a call at the mobile station, in this case the call identifier X. At step 310, a Commit Handover message is sent from the mobile station to the WSM. The message includes a list of call identifiers, in this case including the call identifier X.

The WSM compares the two identifiers and determines that the two identifiers are identical. The identifiers may relate to calls, identities of mobile stations, or both. Thus, the handover is allowed to proceed and the mobile station can switch between an active call and a call on hold during the course of the handover. At step 314, the WSM sends a 200 OK Accept message to the PBX. At step 318, the PBX sends an Answer message (ANM) to the mobile station.

At step 320, the PBX bridges the audio on the two call legs 322 and 324. At step 326, the mobile station sends a BYE message to the WSM. At step 328, the WSM sends the BYE message to the PBX. At step 330, the PBX tears down the bridge and drops the PBX audio segment 332. The audio 334 across the other network remains.

Thus, an active call is switched with an on-hold call while a mobile station is handed out of a WLAN network to another network. In one example, the handout can occur because the match was made between the call identifiers. In another example, the handout can occur because the match was made between mobile station identifiers. Consequently, any switching between the various calls at the mobile station during the handover will have no effect on whether the handout is successful. This feature results in an enhanced experience for users of mobile stations in the network as calls can conveniently be switched as the mobile station is handed out of the WLAN to another network.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method for switching between an active call and a call on hold when handing off a mobile station from a Wireless Local Area Network (WLAN) comprising:
   receiving a Handover Starting message from a mobile station, the Handover Starting message including at least one first identifier and subsequently allowing a mobile station to switch from an active call to a call on hold;
   receiving a Notification message from a Private Branch Exchange (PBX), the Notification message including a second identifier; and
   comparing the at least one first identifier to the second identifier and proceeding with a handover of the mobile station when a match is determined.

2. The method of claim 1 wherein receiving a Handover Starting message comprises receiving a Handover Starting message from a mobile station, the Handover Starting message including a list of call identifiers, the list of call identifiers corresponding to at least one active call at the mobile station.

3. The method of claim 2 wherein receiving a Notification message comprises receiving a Notification message including a second call identifier.

4. The method of claim 1 wherein receiving a Handover Starting message comprises receiving a Handover Starting message from a mobile station, the Handover Starting message including a first mobile station identifier.

5. The method of claim 4 wherein receiving a Notification message comprises receiving a Notification message including a second mobile station identifier.

6. The method of claim 1 further comprising receiving a commit handover message from the mobile station.

7. The method of claim 6 further comprising sending an accept handover call message to the Private Branch Exchange (PBX).

8. A method for switching between an active call and a call on hold when handing a mobile station over from a Wireless Local Area Network (WLAN) comprising:
   receiving a Handover Starting message from a mobile station, the Handover Starting message including a first mobile station identity and subsequently allowing a mobile station to switch from an active call to a call on hold at the mobile station;
   receiving a Notification message from a Private Branch Exchange (PBX), the Notification message including a second mobile station identity; and
   ignoring any call identifiers in the Notification message, comparing the first mobile station identity to the second mobile station identity and proceeding with a handover of the mobile station when there is a match.

9. The method of claim 8 further comprising receiving a commit handover message from the mobile station.

10. The method of claim 9 further comprising sending an accept handover call message to the Private Branch Exchange (PBX).

11. A wireless device comprising:
    a receiver for receiving a Handover Starting message from a mobile station at an input, the Handover Starting message including at least one first identifier, the receiver also receiving a Notification message from a Public Branch Exchange (PBX) at the input, the Notification message including a second identifier; and
    a controller coupled to the receiver and programmed to compare the at least one first identifier to the second identifier and to proceed with a handover of the mobile station when a match is determined and allow switching from a current call to a call on hold at the mobile station.

12. The wireless device of claim 11 wherein the Handover Starting message includes at least one first call identifier, the at least one first call identifier corresponding to at least one on-going call.

13. The wireless device of claim 12 wherein the Notification message includes a second call identifier.

14. The wireless device of claim 11 wherein the Handover Starting message comprises a first mobile station identifier.

15. The wireless device of claim 14 wherein the Notification message comprises a second mobile station identifier.

* * * * *